United States Patent
Miremadi et al.

(10) Patent No.: US 7,889,815 B2
(45) Date of Patent: Feb. 15, 2011

(54) BURST MODE RECEIVER FOR PASSIVE OPTICAL NETWORK

(75) Inventors: Reza Miremadi, West Hills, CA (US); Sean Zargari, Los Angeles, CA (US)

(73) Assignee: Optical Communication Products, Inc., Woodland Hills, CA (US)

( * ) Notice: Subject to any disclaimer, the term of this patent is extended or adjusted under 35 U.S.C. 154(b) by 627 days.

(21) Appl. No.: 11/968,244

(22) Filed: Jan. 2, 2008

(65) Prior Publication Data

US 2008/0212716 A1   Sep. 4, 2008

Related U.S. Application Data (60) Provisional application No. 60/889,732, filed on Feb. 13, 2007.

(51) Int. Cl.
H04L 25/10    (2006.01)

(52) U.S. Cl. .................................. 375/317; 375/319

(58) Field of Classification Search .............. 375/316, 375/317–319; 327/50–52, 63, 65, 67, 68, 327/91; 398/202; 359/325; 330/250, 252, 330/254
See application file for complete search history.

(56) References Cited

U.S. PATENT DOCUMENTS

| | | | |
|---|---|---|---|
| 6,115,163 A | 9/2000 | Nobuhara | |
| 6,868,232 B2 | 3/2005 | Eijk et al. | |
| 6,911,644 B2 | 6/2005 | Doh et al. | |
| 6,977,966 B1 | 12/2005 | Zuhdi et al. | |
| 7,039,329 B2 | 5/2006 | Kenny | |
| 7,206,521 B2 | 4/2007 | Doh et al. | |
| 7,218,865 B2 | 5/2007 | Doh et al. | |
| 7,583,904 B2 * | 9/2009 | Weber et al. | ................. 398/202 |
| 2002/0041417 A1 | 4/2002 | Han et al. | |
| 2002/0196510 A1 * | 12/2002 | Hietala et al. | ................. 359/189 |
| 2003/0067662 A1 * | 4/2003 | Brewer et al. | ................. 359/189 |

(Continued)

FOREIGN PATENT DOCUMENTS

EP    1130841 A1    5/2001

OTHER PUBLICATIONS

Ossieur et al., "A 1.25 Gb/s Burst-mode Receiver for GPON Applications," IEEE journal of solid state circuit, vol. 40, No. 5, May 2005, pp. 1180-1189.*

(Continued)

*Primary Examiner*—Tesfaldet Bocure
(74) *Attorney, Agent, or Firm*—Barlow, Josephs & Holmes Ltd.

(57) ABSTRACT

A receiver assembly for use in an optical telecommunications network is provided that automatically generates a reference level for the incoming signal burst based on its preamble without the need to pre-process the entire signal burst. The entire signal burst is fed directly from the TIA into the input of the limiting amplifier. A differential amplifier, tapped from the data and data bar outputs of the limiting amplifier, samples the signal stream to capture the preamble portion of each signal burst. The preamble portion of the signal burst is then passed, post amplification, into a sample and hold circuit. The sample and hold circuit samples the amplitude of this preamble portion of the signal and then holds the sampled level for use as a reference level for the processing of following payload signal.

16 Claims, 5 Drawing Sheets

U.S. PATENT DOCUMENTS

| | | | |
|---|---|---|---|
| 2003/0194244 A1* | 10/2003 | Doh et al. | 398/202 |
| 2003/0206744 A1* | 11/2003 | Doh et al. | 398/209 |
| 2004/0141759 A1 | 7/2004 | Stiscia et al. | |
| 2004/0247246 A1 | 12/2004 | Lee et al. | |
| 2005/0163149 A1 | 7/2005 | Unitt et al. | |
| 2006/0045529 A1 | 3/2006 | Best | |
| 2006/0120732 A1 | 6/2006 | Baek et al. | |
| 2006/0198634 A1 | 9/2006 | Ofalt et al. | |
| 2007/0030937 A1 | 2/2007 | Yajima et al. | |
| 2007/0116466 A1 | 5/2007 | Gewirtzman et al. | |
| 2007/0122163 A1 | 5/2007 | Dalton et al. | |
| 2007/0140694 A1 | 6/2007 | Choi et al. | |
| 2007/0146080 A1 | 6/2007 | Ivry | |
| 2007/0171998 A1* | 7/2007 | Hietala et al. | 375/317 |

OTHER PUBLICATIONS

Vatannia, Saeid, Yeung, Pak-Ho and Lu, Crist, "A Fast Response 155-Mb/s Burst-Mode Optical Receiver for PON". IEEE Photonics Technology Letters, vol. 17 No. 5, May 2005 pp. 1067-1069.

Schneider, Kerstin and Zimmermann, Horst, "Folded-cascode transimpedance amplifier for burst-mode applications", IEEE 2002, pp. 294-299.

Nakamura, M., Imai, Y., Umeda, Y., Endo, J. and Akatsu, Y., "A burst-mode optical receiver with high sensitivity using a PIN-PD for a 1.25 Gbit/s PON system", NTT Corporation, Optical Society of America 2005.

Qiu, Xing-Zhi, Noldus, Koen, Martens, Yves, Bauwelinck, Johan, Ossieur, Pete, Vandewege, J., Gilon, E., Fredricx, Francois, Bouchat, C., Vetter, P., De Vos, P., "Burst-mode transmitters & receivers for APON applications", Communications Design China, Conference Proceedings, pp. 87-90.

"1.25Gb/s Burst-Mode Transceiver", IT R&D Global Leader, Electronics and Telecommunications Research Institute.

Nishihara, Susumu, Kimura, Shunji, Yoshida, Tomoaki, Nakamura, Makoto, Terada, Jun, Nishimura, Kazuyoshi, Kishine, Keiji, Kato, Kazutoshi, Ohtomo, Yusuke and Imai, Takamasa, "A 10.3125-Gvit/s SiGeBiCMOS Burst-Mode 3R Receiver for 10G-EPON Systems", NTT Corporation.

* cited by examiner

BURST MODE RECEIVER FOR PASSIVE OPTICAL NETWORK

CROSS-REFERENCE TO RELATED APPLICATIONS

This application is related to and claims priority from earlier filed U.S. Provisional Patent Application No. 60/889,732, filed Feb. 13, 2007.

BACKGROUND OF THE INVENTION

The present invention relates generally to fiber optic telecommunication systems. More specifically, the present invention relates to a fiber optic receiver assembly for use in a passive optical network that must receive and convert burst mode optical signals from a plurality of sources, wherein each signal being received has a different amplitude.

Figure 1:
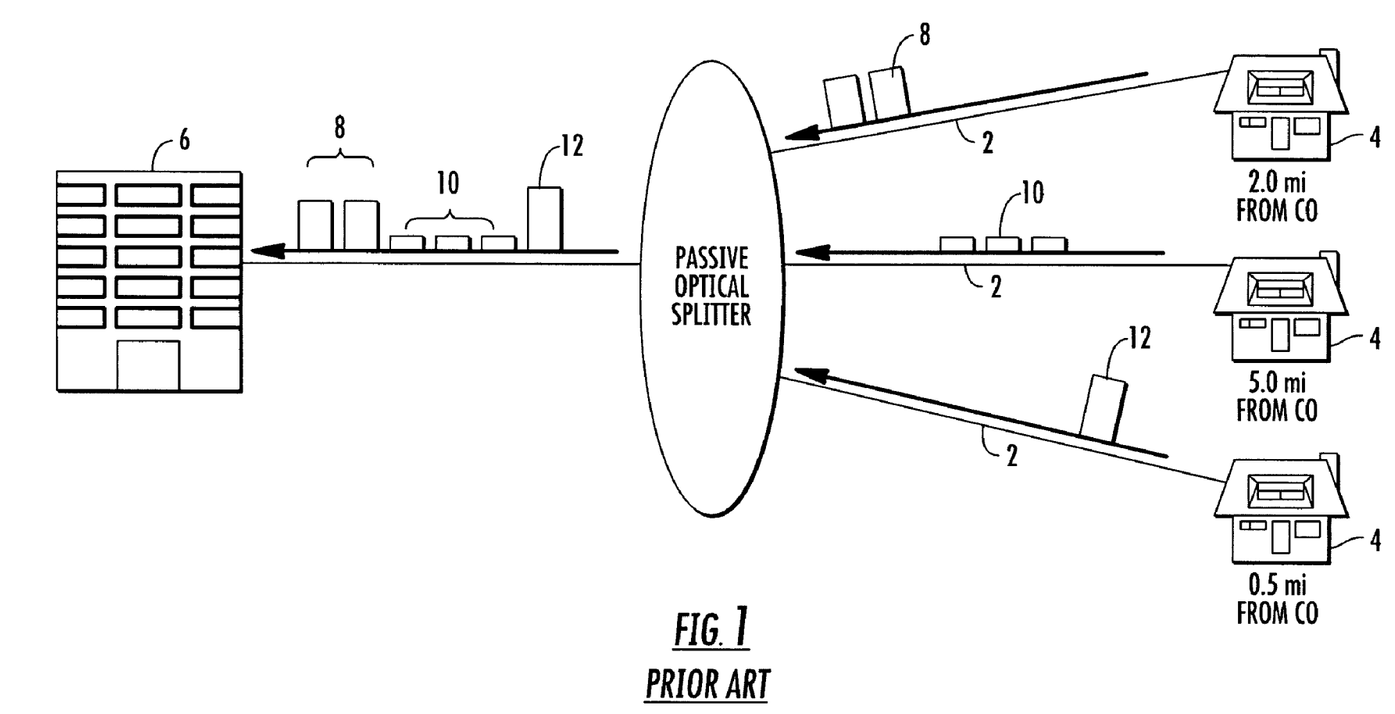
FIG. 1 is a graphical illustration of a prior art passive optical network transmitting burst mode signals having varying amplitude.

Telecommunication companies are slowly starting to convert their carrier networks from traditional copper wiring to passive optical network systems as part of Fiber To The Premise (FTTP) and Fiber To The Home (FTTH) communication and content delivery services. For example, a number of telecommunications service providers are now offering fiber optic Internet services and fiber optic television services. These passive optical networks are structured in a manner that is generally similar to the older copper wire networks. As can be seen in FIG. 1, a representative passive optical network can be seen to a plurality of communications lines 2 that extend outwardly to each of the individual service locations 4 (homes or businesses) from a central office 6 (CO) location. The CO 6 in turn serves to control, direct and monitor the transmission and receipt of the signals 8, 10, 12 traveling to and from each of the connected individual service locations 4.

One of the current technical issues being addressed in the implementation of the passive optical networking environment is the fact that there is a large variation in the amplitude of the incoming signals 8, 10, 12 being received at the CO 6 from each of the individual service locations 4. For example, in a FTTH system, one service location 4 may be located 0.5 miles from the central office 6, while another service location 4 may be located 5.0 miles from the central office 6. In each of these service locations 4, the transmitters are essentially the same and therefore transmit their respective data signals 8, 10, 12 to the CO 6 using the same output power level. The difficulty arises as a result of the fact that, since optical signals degrade within a fiber optic cable over distance, the signal received 12 at the CO 6 from the closer service location has an amplitude that is larger than the amplitude of the signal received 10 at the CO 6 from the more distant location. These differences in amplitude become a problem because the passive optical network systems are time division multiplexed (TDM) systems, where the CO 6 receiver is constantly receiving timed bursts 8, 10, 12 in a random pattern from each of the different locations, one after another, with a signal spacing of tens of nano-seconds. As a result, the receivers must be able to quickly and accurately detect and convert all of the incoming signal bursts from the different locations, each having varying amplitudes, into valid data.

Figure 2:
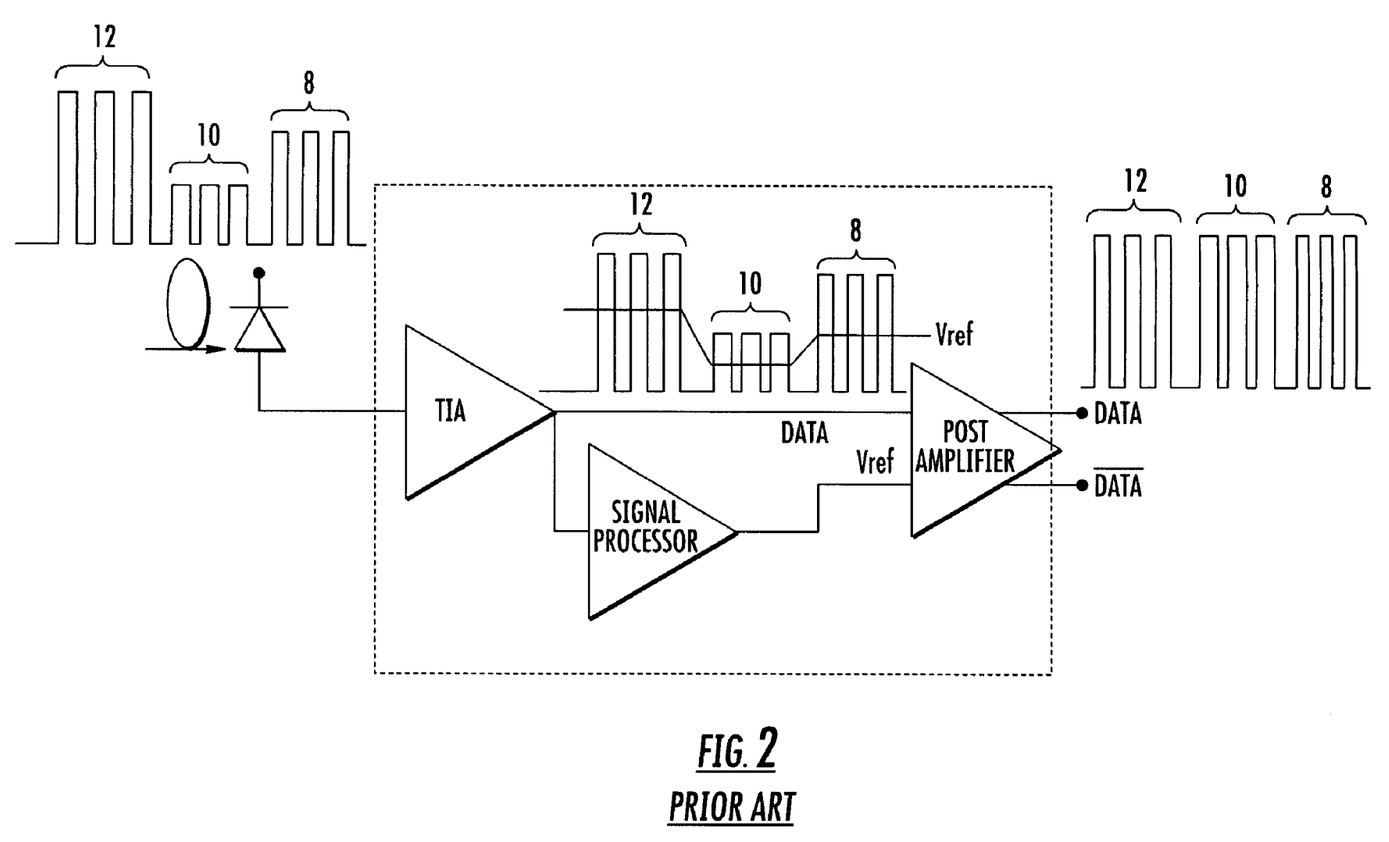
FIG. 2 is a schematic illustration of a prior art burst mode receiver configuration.

In order to deal with this issue, typically as is depicted at FIG. 2, the conversion of the bursts to digital data is done by first generating a reference level to which the input data stream is compared. In such an arrangement, the signal received at the transimpedance amplifier (TIA) is first routed through a signal processor to evaluate the entire signal and to detect the signal amplitude. As a result, a reference level (Vref) is generated by the signal processor for each of the signal bursts received, wherein the reference level is an average power level or average amplitude value based on the signal amplitude within the associated signal burst. It can be appreciated that since each burst is different, they each require that a different reference level be calculated. The actual signal burst is then passed along to the post amplifier along with the calculated reference level for processing.

The problem is that in using the prior art signal burst conversion method described above to generate the required reference level, the characteristics of the signal burst must be measured and processed before it is input to the limiting amplifier. In this arrangement, the signal processor measures the average, or peak-to-peak amplitude of the signal burst and generates a reference level (average power level) associated with signal burst. Since the signal gain of the pre-amplified signal is relatively low it is often difficult to calculate the necessary reference level. Further, in this arrangement, the signal processor and the resultant reference level leave the limiting amplifier outside the control loop thereby subjecting the signal to possibly uncontrolled variations that are introduced due to variations in the limiting amplifier itself. Another obvious issue in this method is the need for a signal processor to measure the amplitude of and generate a reference level for the entirety of each and every burst being received.

There is therefore a need for a receiver that can be used in a passive optical networking environment that eliminates the need to preprocess the entirety of each signal burst received in order to generate a reference level. Further, there is a need for a receiver that generates a reference level after the preamble of the signal burst has been amplified by the limiting amplifier that in turn allows the reference level to then be used for processing the remainder of the signal burst. Still further there is a need for a receiver that includes the limiting amplifier in the reference level calculation thereby accounting for offset voltages and current drift generated by the limiting amplifier itself.

BRIEF SUMMARY OF THE INVENTION

In this regard, the present invention provides for an improved receiver assembly for use in an optical telecommunications network. The circuitry in the receiver of the present invention automatically generates a reference level for the incoming signal burst based on its preamble without the need to pre-process the entire signal burst to measure a reference level from the signal as was the case in the prior art. Further, the particular arrangement of the receiver assembly of the present invention provides for the sampling of the signal burst after it has been amplified in order to determine a reference amplitude for the incoming signal burst such that the amplitude can then be used for the processing and amplification of the remaining portion of the signal burst.

It is commonly known in the art, that in order to facilitate balancing of the plurality of signal bursts in a passive optical network, each signal burst includes a preamble portion and a payload portion, wherein the preamble portion includes an electronic reset pulse, a reference high pulse and a reference low pulse. In contrast to the prior art wherein the entire signal burst was preprocessed, the present invention feeds the entire signal burst directly from the TIA into the input of the limiting amplifier. A differential amplifier that is tapped from the data and data bar outputs of the limiting amplifier then samples the signal stream to capture the preamble portion of each signal burst. The preamble portion of the signal burst is then passed, post amplification, into a sample and hold circuit. The sample and hold circuit samples the amplitude of this preamble portion of the signal and then holds the sampled level for use as a reference level for the processing of following payload signal. In operation, the sample and hold circuit closes when the reset pulse goes high and samples the power level. When the reset pulse goes low at the end of the preamble, the sample and hold circuit holds the sampled reference power level, which is then also fed to the limiting amplifier for use as the reference level for processing of the associated payload immediately following the preamble. When a new reset signal is received from the preamble of the next signal burst, the sample and hold circuit is reset and then obtains a new reference level for processing of the next signal burst in line. As a result, the receiver circuit of the present invention operates automatically and does not require the use of a signal processor to measure the entire signal burst in order to generate a reference level.

It is therefore an object of the present invention to provide a receiver assembly that can be used in a passive optical networking environment that eliminates the need to preprocess each signal burst received in order to generate an associated reference level. It is a further object of the present invention to provide a receiver assembly that generates a reference level after a portion of the signal burst has been amplified by the limiting amplifier. It is still a further object of the present invention to provide an optical receiver that includes the output of the limiting amplifier within the reference level calculation, thereby generating a reference level that accounts for offset voltages and current drift generated by the limiting amplifier itself.

These together with other objects of the invention, along with various features of novelty that characterize the invention, are pointed out with particularity in the claims annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Now referring to the drawings, an improved receiver assembly for use in an optical telecommunications network as provided for in the teachings of the present invention is shown and generally illustrated. As can best be seen in FIG. 3, the receiver 20 of the present invention generally includes a transimpedance amplifier (TIA) 22, a limiting amplifier 24, a differential amplifier 26 and a sample and hold circuit 28. While the operation of the receiver 10 of the present invention will be discussed in detail below, in general terms, the TIA 22 receives an incoming signal and passes it along to the limiting amplifier 24, the differential amplifier 26 samples the output from the limiting amplifier 24 in order to determine the average power level of the incoming signal and provides this information to a sample and hold circuit 28 that applies a threshold adjustment to the limiting amplifier 24 for use in amplifying the balance of the signal. In this regard, the circuitry in the receiver 20 of the present invention automatically generates a reference level for the power of the incoming signal burst based on its preamble without the need to preprocess the entire signal burst to measure a reference level from the signal as was the case in the prior art. Further, the particular arrangement of the receiver assembly 20 of the present invention provides for the sampling of the signal burst after it has been amplified in order to determine a reference amplitude for the incoming signal burst such that the amplitude can then be used for the processing and amplification of the remaining portion of the signal burst.

Figure 3:
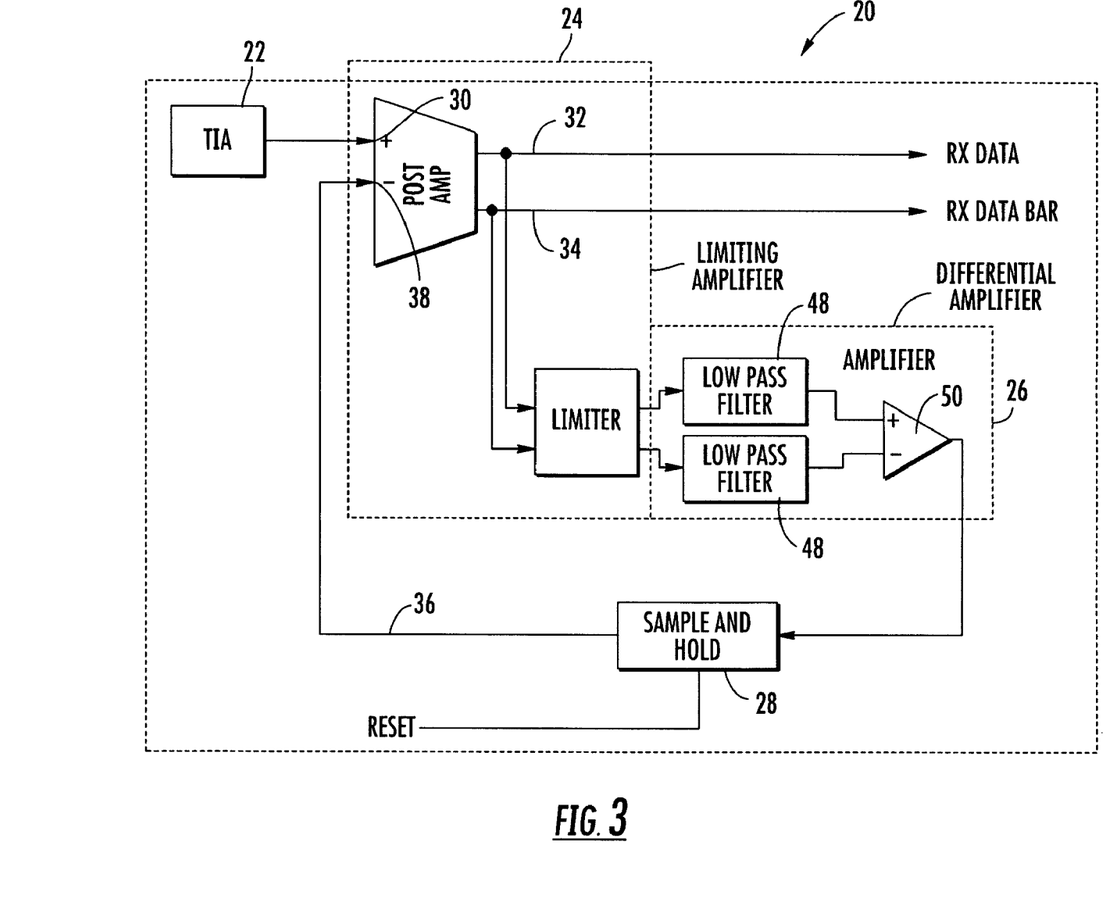
FIG. 3 is a schematic illustration of a preferred embodiment of the burst mode receiver configuration of the present invention.

In a preferred embodiment of the improved burst mode receiver circuit 10 of the present invention, the incoming signal is fed directly from the TIA 22 into the input 30 of the limiting amplifier 24 where the signal is amplified and passed to the TIA outputs 32, 34. The TIA outputs 32, 34 include a data output 32 and a data bar output 34 as are known in the art. A differential amplifier 26, which is tapped from the data and data bar outputs 32, 34 captures the differential voltage between the data and data bar outputs 32, 34 which it then passes along to a sample and hold circuit 28. The sample and hold circuit 28, using the differential voltage from the differential amplifier 26, then applies a threshold adjustment 36 to the threshold input 38 on the limiting amplifier 24 wherein the threshold adjustment 36 is used for the amplification of the remainder of the signal in the burst.

Figure 4:
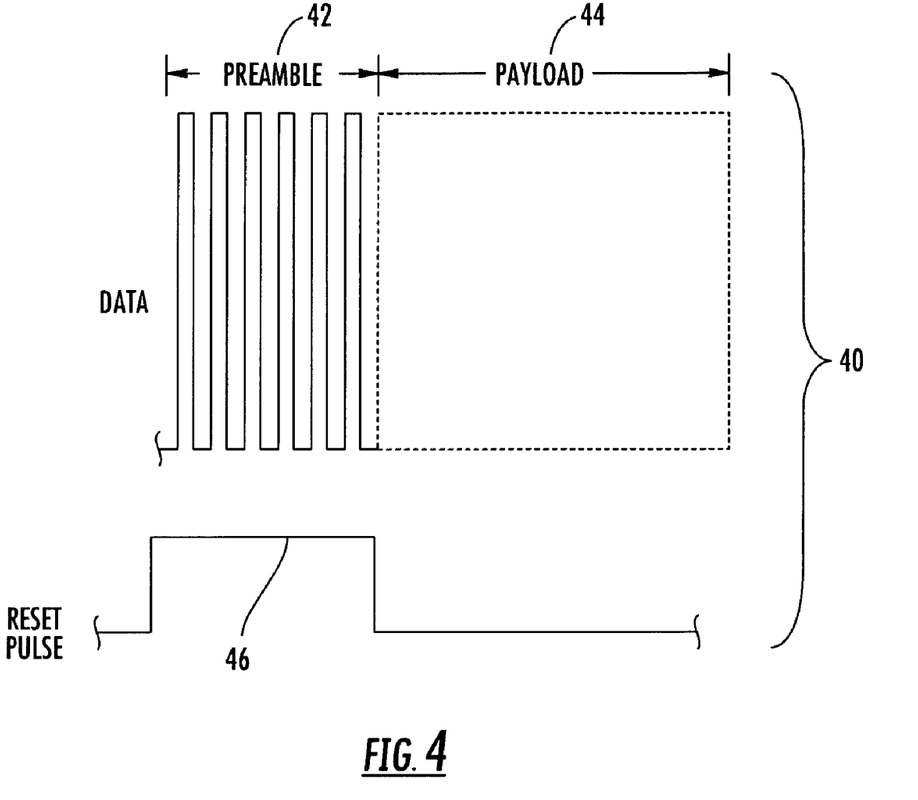
FIG. 4 is a graphical illustration of a timing chart for the reset pulse relative to the preamble and payload.

To better understand the manner in which the receiver 20 of the present invention handles a signal burst, a representative signal burst 40 is depicted at FIG. 4. It can be seen that each signal burst 40 includes a preamble portion 42 and a payload portion 44. Further, the preamble portion 42 can be seen to include an electronic reset pulse 46 that remains high for the duration of the preamble 42 and then drops low during the payload portion 44 of the signal burst 40. In operation, in the context of the preferred embodiment described above in FIG. 3, as the signal burst 40 passes through the limiting amplifier 24, the reset signal 46 goes high as the preamble portion 42 of the signal burst 40 is being passed. The high reset signal 46 causes the sample and hold circuit 28 to close causing it to sample the average power level of the preamble 42 of the signal burst 40. At the end of the preamble 42, the reset pulse 46 goes low causing the sample and hold circuit 28 to hold the average power reading, which is then passed along to the threshold input 38 of the limiting amplifier 24. This transmitted power reading is then used by the limiting amplifier 24 as the reference level for amplification of the following payload 44. Each time a new signal burst 40 is received the above process is repeated, wherein the reset pulse 46 goes high causing a new reference voltage to be set within the sample and hold circuit 28 for use in connection with the amplification of the following payload 44. In this regard, the feedback loop of the present invention is automatic and does not require the use of a signal processor to measure the signal and generate a reference level.

In the context of a passive optical network, a plurality of signal bursts 40 are all streaming into the receiver 20 sequentially, one after another. Accordingly, is should be appreciated that the receiver 20 as described above, performs the preamble 42 sampling and amplification threshold 36 adjustment repetitively for each of the signal bursts 40 received. In other words, when the reset signal 46 goes high, as the limiting amplifier 24 passes the preamble 42 of the signal burst 40, the differential amplifier 26 passes a voltage differential, which is calculated from the signal preamble 42, into the sample and hold circuit 28. When the reset signal 46 goes low, the sample and hold circuit 28 applies the voltage differential to the limiting amplifier 24 as a threshold adjustment 36 for the duration of the signal burst 40 payload portion 44. When the next signal burst 40 is received, the reset signal 46 again goes high and the entire process is repeated.

In greater detail the differential amplifier 26 of the present invention can be seen to employ low pass filters 48 when sampling the signal from both the data 32 and data bar 34 outputs of the limiting amplifier 24. If the output duty cycle of the data 32 and data bar 34 signals is 50% then the voltage difference between the outputs of the two low pass filters 48 would be zero and therefore the adjustment 36 passed to the threshold input 38 on the limiting amplifier 24 would be zero. However, if the output duty cycle at the low pas filters 48 were not to equal 50%, the difference in the voltages between the two low pass filters 48 is then amplified by the amplifier 50 and then passed to the threshold input 38 of the limiting amplifier 24 as a threshold adjustment 36. Further, the above sampling only takes place as the reset pulse 46 is high and then is held for the duration of the signal burst 40 pulse to ensure constant signal burst 40 amplification.

There are numerous advantages that result from the receiver 20 configuration of the present invention. The first advantage is that the preamble 42 of the signal burst 40 is being amplified before processing and determination of the threshold level 36 of the signal burst 40. It can be appreciated that at low input power levels the input voltage is only a few millivolts and it is often difficult to accurately read the differential or threshold level of the incoming signal. However, the limiting amplifier 24 has a gain of approximately 50 and therefore allows the differential amplifier 26 and the sample and hold circuitry 28 to make the threshold determination based on an amplified version of the input signal burst 40 that is in the range of a few hundred millivolts at the output 32, 34 of limiting amplifier 24.

The second advantage in the receiver 20 arrangement of the present invention is the feedback within the loop is self-calibrating. It is known in the art that limiting amplifiers 24 are not perfect and that they cause their own pulse width distortion. These limitations within the limiting amplifier 24 include offset voltage and current drifts at the input of the limiting amplifier 24 and power supply rejection issues. By placing the limiting amplifier 24 inside the threshold adjustment loop, the sampled signal burst 40 already includes any limitations imparted to the signal burst 40 by the limiting amplifier 24. As a result the threshold adjustment 36 applied by the sample and hold circuit 28 also serves to calibrate out the limiting amplifier 24 induced error at the beginning of each signal burst 40.

Figure 5:
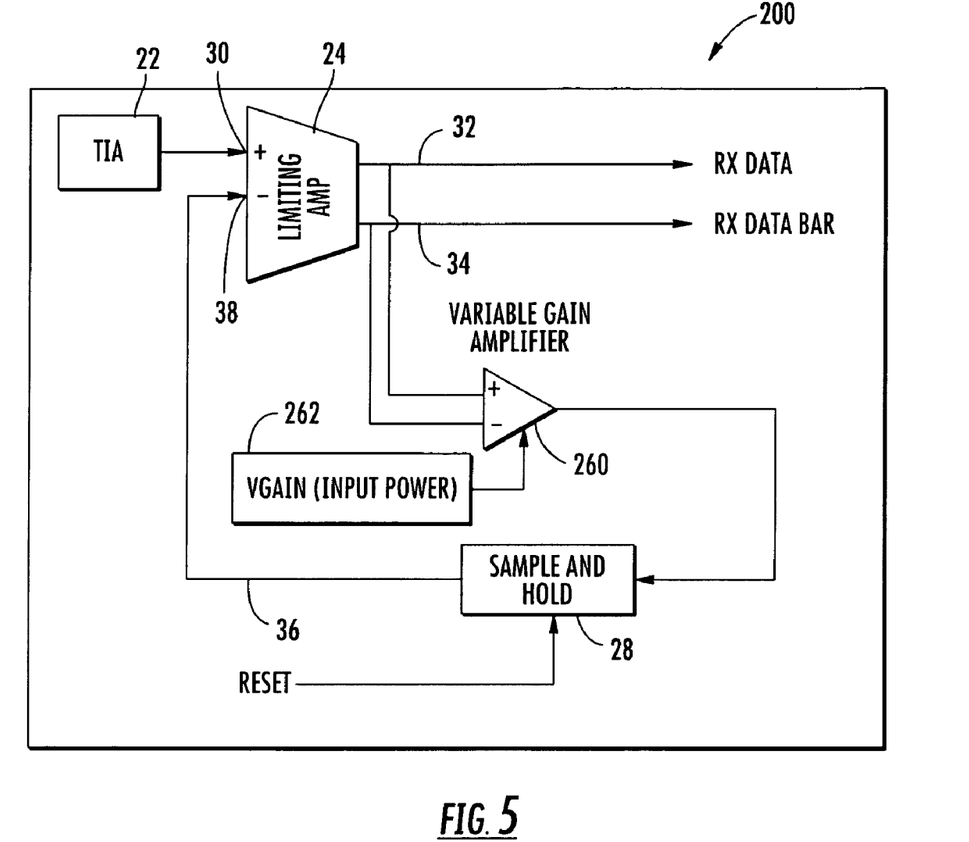
FIG. 5 is a schematic illustration of a second preferred embodiment of the burst mode receiver configuration of the present invention.

It is possible that one problem that may arise in the context of the receiver 20 of the present invention is the fact that the limiting amplifier 24 gain is variable and operates as a function of the input signal strength. The limiting amplifier 24 gain can vary from between approximately 1 to 50 depending on the amplitude of the optical input signal. In order to close this control loop this potentially wide gain variation within the limiting amplifier 24 must be accounted for. To account for this variable gain issue, a second embodiment of the receiver of the present invention is shown at FIG. 5. In this embodiment, the receiver 200 circuitry is arranged as described above with respect to the preferred embodiment. However, the differential amplifier 26 employed above instead is provided as a variable gain amplifier 260. A voltage (Vgain) 262 is generated that is a function of the input optical power related to the incoming signal burst 40. The Vgain voltage 262 can be generated from the output of the TIA 22 or from an optical power monitor circuitry disposed within the module (not shown). This Vgain voltage 262 is applied to the variable gain amplifier 260 and is used to vary the threshold adjustment 36 gain thereby keeping it in synchronization with the gain being applied at the limiting amplifier 24. In this manner, the Vgain 262 adjustment serves to keep the signal pulse 40 bandwidth constant. In this embodiment, the bandwidth of the feedback loop is held more constant because the gain variations of the limiting amplifier 24 are compensated for by the variable gain amplifier 260.

In both of the embodiments described above, it should be appreciated that the signal from the TIA 22 can also be differentially coupled to the limiting amplifier 24 for additional sensitivity. Here the inverting output of the TIA is ac or dc coupled to the inverting input of the limiting amplifier. This combines the feedback signal with the inverting TIA output signal to obtain additional sensitivity.

Finally, in both of the embodiments indicated above, the sample and hold circuit 28 can be implemented in multitude of different ways. The sample and hold circuit 28 can be a peak and valley detector with averaging circuit to give you the mid level of the input signal. This sample and hold can also be "leaky" where in the off state there is a high value resistor bypassing the sampling switch. This leaky sample and hold can track small variations in bias shift that may occur when in holding mode. The sample and hold circuit 28 can also be implemented with an analog to digital converter followed by a digital to analog converter. This sample and hold circuitry 28 can be stand alone or part of a microcontroller.

It can therefore be seen that the present invention provides an improved receiver 20 assembly for use in an optical telecommunications network that automatically generates a reference level for the incoming signal burst 40 based on its preamble 42 without the need to pre-process the entire signal burst to measure a reference level from the signal as was the case in the prior art. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A burst mode receiver comprising:
    a transimpedance amplifier (TIA) for receiving an incoming burst mode signal, said burst mode signal including a preamble and a payload;
    an amplifier having a signal input and a threshold input, said signal input connected to an output of said TIA, said amplifier amplifying said burst mode signal and outputting a data signal and a data bar signal;
    a differential amplifier coupled to said data signal and said data bar signal, wherein said differential amplifier samples said preamble from said data signal and said data bar signal to determine an average power level for said preamble; and
    a sample and hold circuit connected to said differential amplifier and said threshold input, wherein said sample and hold circuit applies a threshold adjustment to said amplifier based on said average power level, said threshold adjustment being maintained for the duration of transmission of said payload.

2. The burst mode receiver of claim 1, said burst mode signal including a reset pulse, said reset pulse being high during said preamble and low during said payload, wherein said differential amplifier determines said average power level when said reset pulse is high and said sample and hold circuit applies said threshold adjustment when said reset pulse is low.

3. The burst mode receiver of claim 1, said TIA receiving a plurality of incoming burst mode signals, said differential amplifier determining a corresponding average power level upon receipt of said preamble in each of said burst mode signals and said sample and hold circuit applying a threshold adjustment for each of said payloads corresponding to each preamble.

4. The burst mode receiver of claim 1, wherein said differential amplifier comprises:
   a first low pass filter coupled to said data signal generating a first output;
   a second low pass filter coupled to said data bar signal generating a second output; and
   an amplifier coupled to said first and second outputs, said amplifier calculating a voltage difference between said first and second outputs, said amplifier outputting said voltage difference to said sample and hold circuit.

5. The burst mode receiver of claim 4, said burst mode signal including a reset pulse, said reset pulse being high during said preamble and low during said payload, wherein said differential amplifier determines said average power level when said reset pulse is high and said sample and hold circuit applies said threshold adjustment when said reset pulse is low.

6. The burst mode receiver of claim 4, said TIA receiving a plurality of incoming burst mode signals, said differential amplifier determining a corresponding average power level upon receipt of said preamble in each of said burst mode signals and said sample and hold circuit applying a threshold adjustment for each of said payloads corresponding to each preamble.

7. The burst mode receiver of claim 1, said amplifier having voltage drift and duty cycle distortion, wherein said differential amplifier includes said voltage drift and said duty cycle distortion into said determination of said average power level such that said threshold adjustment applied to said payload of said burst mode signal includes a correction for said voltage drift and said duty cycle distortion.

8. The burst mode receiver of claim 1, wherein said differential amplifier is a variable gain differential amplifier, a gain of said variable gain amplifier being controlled by the output level of said TIA.

9. A method of receiving and amplifying a burst mode signal comprising a preamble and a payload, said method comprising:
   receiving an incoming burst mode signal in a transimpedance amplifier (TIA);
   transmitting said burst mode signal to an amplifier having a signal input and a threshold input, said signal input connected to an output of said TIA;
   amplifying said burst mode signal and outputting a data signal and a data bar signal;
   sampling said preamble using a differential amplifier coupled to said data signal and said data bar signal, to determine an average power level for said preamble; and
   applying a threshold adjustment to said threshold input of said amplifier based on said average power level, said threshold adjustment being maintained for the duration of transmission of said payload.

10. The method of claim 9, said burst mode signal including a reset pulse, said reset pulse being high during said preamble and low during said payload, wherein said differential amplifier determines said average power level when said reset pulse is high and said threshold adjustment is applied when said reset pulse is low.

11. The method of claim 9, said TIA receiving a plurality of incoming burst mode signals, said differential amplifier determining a corresponding average power level upon receipt of said preamble in each of said burst mode signals and said threshold adjustment being applied to each of said payloads corresponding to each preamble.

12. The method of claim 9, wherein said differential amplifier comprises:
   a first low pass filter coupled to said data signal generating a first output;
   a second low pass filter coupled to said data bar signal generating a second output; and
   an amplifier coupled to said first and second outputs, said amplifier calculating a voltage difference between said first and second outputs, said amplifier outputting said voltage difference as said threshold adjustment.

13. The method of claim 12, said burst mode signal including a reset pulse, said reset pulse being high during said preamble and low during said payload, wherein said differential amplifier determines said average power level when said reset pulse is high and said threshold adjustment is applied when said reset pulse is low.

14. The method of claim 12, said TIA receiving a plurality of incoming burst mode signals, said differential amplifier determining a corresponding average power level upon receipt of said preamble in each of said burst mode signals and said threshold adjustment being applied to each of said payloads corresponding to each preamble.

15. The method of claim 9, said amplifier having voltage drift and duty cycle distortion, wherein said differential amplifier includes said voltage drift and said duty cycle distortion into said determination of said average power level such that said threshold adjustment applied to said payload of said burst mode signal includes a correction for said voltage drift and said duty cycle distortion.

16. The method of claim 9, wherein said differential amplifier is a variable gain differential amplifier, a gain of said variable gain amplifier being controlled by the output level of said TIA.

* * * * *